United States Patent

Futakata et al.

[11] Patent Number: 5,438,576
[45] Date of Patent: Aug. 1, 1995

[54] DATA COMMUNICATION APPARATUS AND METHOD INCLUDING MEANS FOR AND STEP OF ADDING DUMMY CHARACTER AS A NEW LAST CHARACTER OF DATA TO BE TRANSMITTED

[75] Inventors: Takashi Futakata, Yokohama; Mitsuo Uchimura, Numazu; Masashi Suzuki, Mishima, all of Japan

[73] Assignee: Tokyo Electric Co., Ltd., Tokyo, Japan

[21] Appl. No.: 144,294

[22] Filed: Oct. 27, 1993

[51] Int. Cl.6 ............................................. G06F 11/10
[52] U.S. Cl. ...................................... 371/53; 395/575
[58] Field of Search .................. 371/53; 395/575, 275; 360/14.2

[56] References Cited

U.S. PATENT DOCUMENTS

| | | | |
|---|---|---|---|
| 5,153,585 | 10/1992 | Negishi et al. | 340/870.28 |
| 5,229,890 | 7/1993 | Okauchi | 360/14.2 |
| 5,253,345 | 10/1993 | Fernandes et al. | 395/275 |

Primary Examiner—Hoa T. Nguyen
Attorney, Agent, or Firm—Frishauf, Holtz, Goodman & Woodward

[57] ABSTRACT

A communication apparatus includes a control circuit for obtaining a transmission text formed of one of a single character and a series of characters, the last of which is one of specified control characters and a character of error check data, and a radio communication unit connected to the control circuit, for storing each character of the transmission text supplied from the control circuit and transmitting the transmission text stored therein. Particularly, the control circuit is arranged to add a dummy character after the character of error check data as a new last character except in the case where the character of error check data has a value identical to the code of the dummy character. The radio communication unit is arranged to transmit the transmission text upon detecting the code of any one of the dummy and specified control characters in the transmission text.

16 Claims, 6 Drawing Sheets

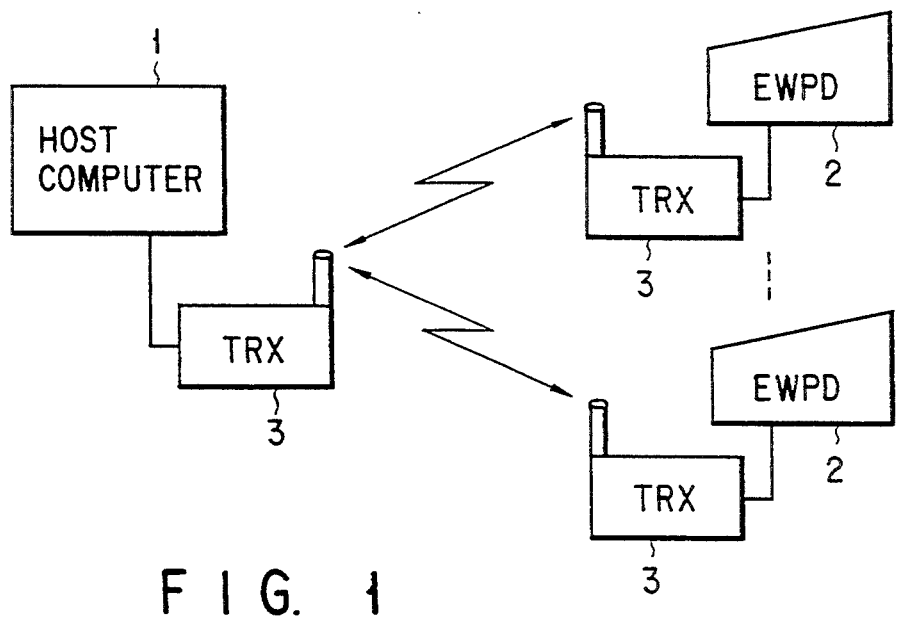
F I G. 1
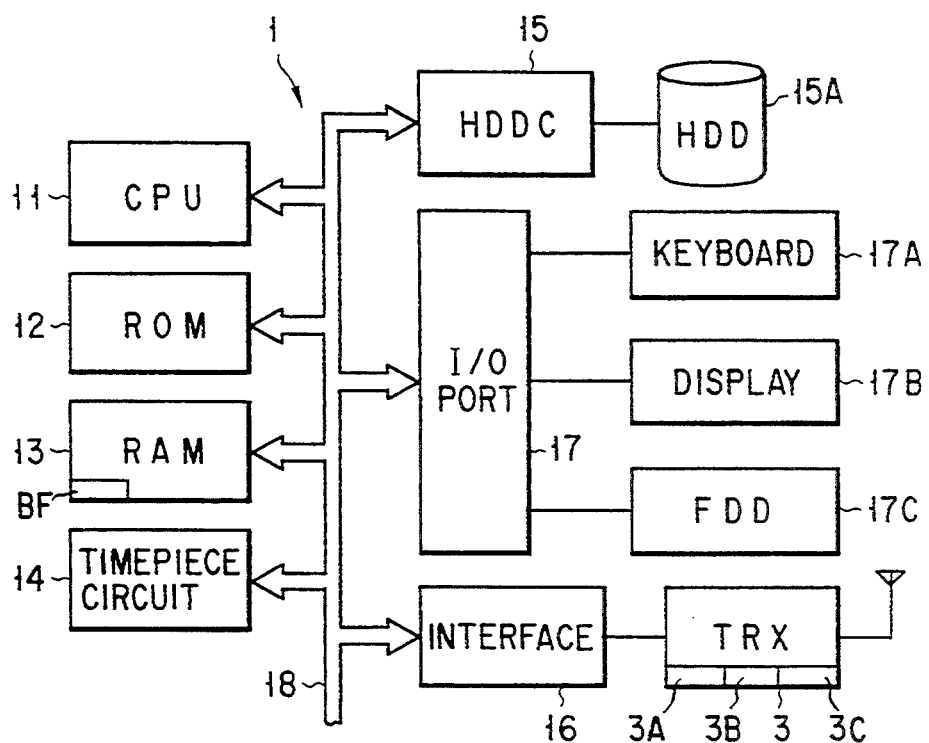
F I G. 2

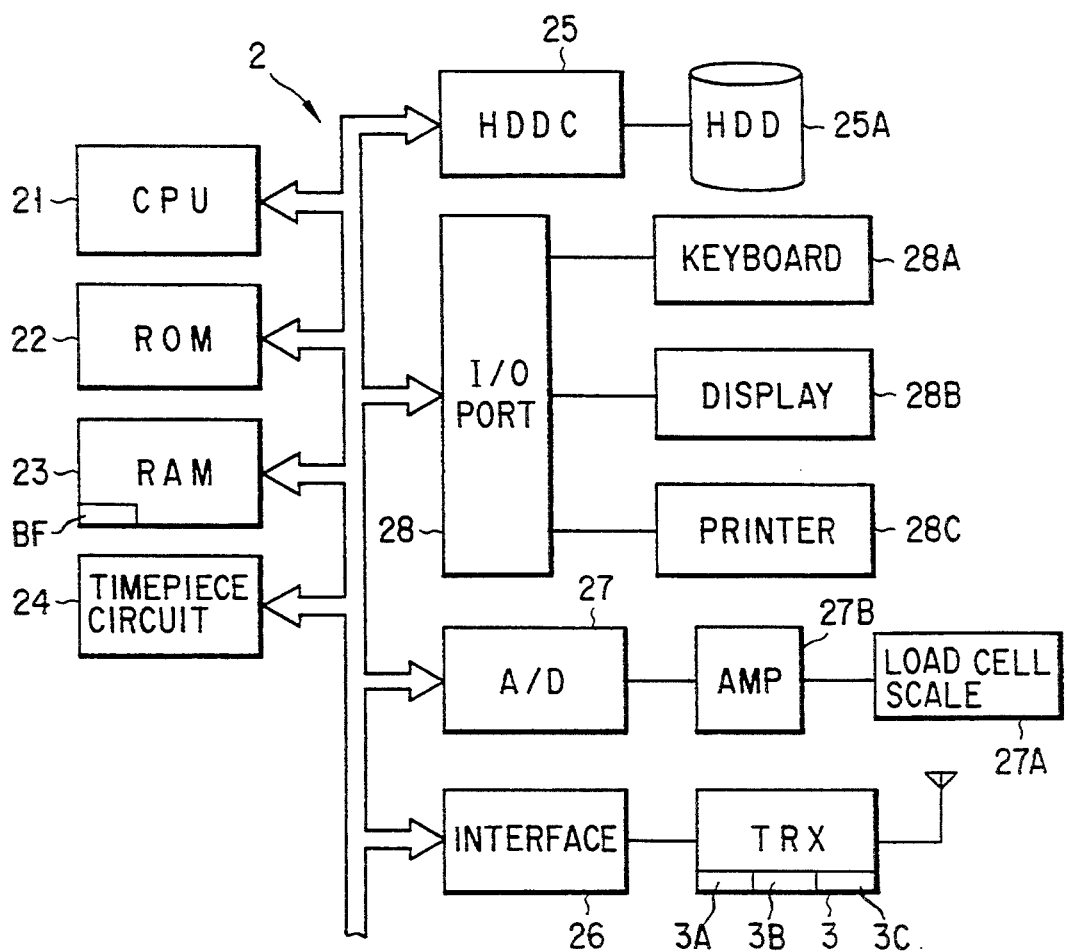
F I G. 3

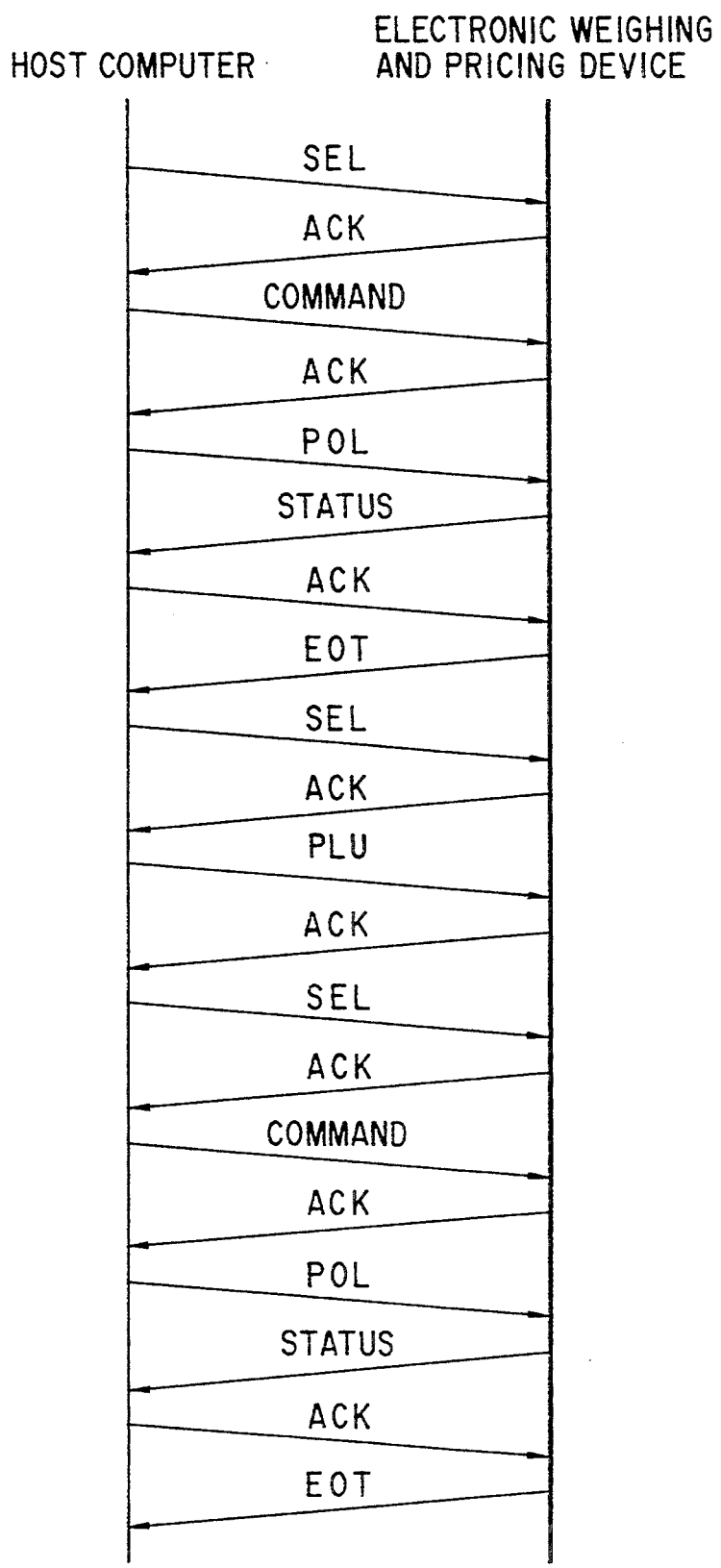
F I G. 4

DATA COMMUNICATION APPARATUS AND METHOD INCLUDING MEANS FOR AND STEP OF ADDING DUMMY CHARACTER AS A NEW LAST CHARACTER OF DATA TO BE TRANSMITTED

BACKGROUND OF THE INVENTION

1. Field of the Invention

The present invention relates to a communication apparatus and method for transmitting and receiving various texts, and more particularly, to those used in a Point of Sales (POS) system and the like.

2. Description of the Related Art

In a large-scale retail store such as a supermarket, a POS system is used to enhance operational efficiency. A typical POS system comprises a single host computer and a plurality of terminals connected to the host computer by a communication cable. The host computer includes a Price Look Up (PLU) file, a sales file, and other files. Article data such as article codes, department codes, unit prices, and other data items of various articles are registered in the PLU file, and sales data such as article codes, sales amounts, and other data items of articles being sold are registered in the sales file. The article data are retrieved from the PLU file and supplied to the terminals via the communication cable. The terminals are, for example, an Electronic Cash Register (ECR) and an Electronic Weighing and Pricing Device (EWPD). The ECRs perform settlement processings on the basis of the article data supplied from the host computer. The EWPDs perform label issuing processings also on the basis of the article data supplied from the host computer. Sales data or the results of the processings are supplied from the terminals to the host computer via the communication cable.

In actual communication, various control texts are required for communication procedures in addition to data texts such as the article data and the sales data. The control and data texts are selectively retrieved as a transmission text, and converted into the form of a character or a series of characters, and supplied to the communication cable. The last character of the transmission text is one of specified control characters and a character of error check data. The specified control character is provided for the control text, and the character of error check data is provided for the data text. The error check data is used in horizontal parity check or the like effected to detect a reception error.

Recently, there appeared a POS system in which the host computer communicates with terminals by means of radio communication units respectively connecting the terminals to the host computer. Each radio communication unit stores a transmission text formed of one or more characters sequentially supplied from the host computer or the terminal, and performs a transmission process on the transmission text. Completion of preparing the transmission text is confirmed when the character supply has been stopped for a predetermined amount of time. In the transmission process, the stored characters are converted to a radio signal and transmitted from the radio communication unit.

However, time is being wasted while the predetermined amount of time elapse before the preparation of transmission text is confirmed. In other words, the transmission process cannot be started immediately after the last character of the transmission text have been provided.

SUMMARY OF THE INVENTION

The object of the present invention is to provide a communication apparatus and a communication method capable of reducing the total communication time.

This object is attained by a communication apparatus comprising: a transmission controller for obtaining a transmission text formed of one of a single character and a series of characters, the last of which is one of specified control characters and a character of error check data, and adding a dummy character after the character of error check data as a new last character except in the case where the error check data has a value identical to the code of the dummy character; and a transmitting section connected to the transmission controller, for storing each character of the transmission text supplied from the transmission controller, and transmitting the transmission text upon detecting the code of any one of the dummy and specified control characters in the transmission text.

The object of the present invention is also attained by a communication method comprising: a step of obtaining a transmission text formed of one of a single character and a series of characters, the last of which is one of specified control characters and a character of error check data, and adding a dummy character after the character of error check data as a new last character except in the case where the error check data has a value identical to the code of the dummy character; and a step of storing each character of the transmission text provided in the obtaining and adding step, and transmitting the transmission text upon detecting the code of any one of the dummy and specified control characters in the transmission text.

According to these communication apparatus and method, a dummy character is added after the character of error check data as a new last character except in the case where the error check data has a value identical to the code of the dummy character. Therefore, the transmission text can be transmitted immediately after the code of any one of the dummy and specified control characters is detected in the transmission text. Since it is not necessary to have a certain amount of time elapsed before the start of the text transmission, the total communication time can be reduced, as compared to conventional communication apparatus and method.

Suppose that a dummy character is added to every transmission text. In this case, even when the value of the error check data is identical to the code of the dummy character, the dummy character is added after the character of error check data as a new last character. Therefore, after the character of error check data has been transmitted, additional transmission would be unnecessarily effected due to the dummy character succeeding the character of error check data. On the contrary, in the present invention, the dummy character is not added to a transmission text whose last character is a character of certain error check data having a value identical to the code of the dummy character. Accordingly, the aforementioned redundant transmission can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a block diagram schematically showing the entire structure of a POS system according to an embodiment of the present invention;

FIG. 2 is a block diagram showing in greater detail the structure of a host computer shown in FIG. 1;

FIG. 3 is a block diagram showing in greater detail the structure of an electronic weighing and pricing device (EWPD) shown in FIG. 1;

FIG. 4 shows an example of the communication sequence effected between the host computer shown in FIG. 2 and the EWPD shown in FIG. 3 to set article data in a department PLU file;

DETAILED DESCRIPTION OF THE PREFERRED EMBODIMENTS

Figure 5A:
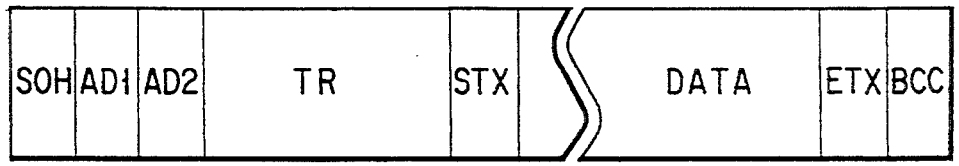
FIG. 5A to FIG. 5F show examples of transmission texts transmitted between the host computer shown in FIG. 2 and the EWPD shown in FIG. 3.

A POS system according to an embodiment of the present invention will now be described with reference to the accompanying drawings.

FIG. 1 shows schematically the entire structure of the POS system. The POS system comprises a host computer 1 for managing a PLU (Price Look Up) file, a sales file, and other files, a plurality of Electronic weighing and Pricing Devices (EWPD) 2 serving as terminals of the host computer 1, and first and second radio communication units 3 connected to the host computer 1 and the EWPDs 2, respectively, for effecting radio communications therebetween. Each PLU file includes article data such as article codes, department codes, unit prices, and other data items of various articles. Each sales file includes sales data such as articles codes, sales amounts, and other data items of articles being sold. The number of data items included in the article data and sales data is freely set by a store in which the POS system is installed. The host computer 1 is installed in the office of a store, and the EWPDs 2 are installed at the sales counters of different sales departments, such as meat, fish, produce, etc., which are remote from the office. The host computer 1 reads out items of article data for one sales department from the PLU file, and transmits the article data to the EWPD 2 at that sales department by radio communication. The EWPD 2 manages a department PLU file which stores the article data from the host computer 1, and performs a label issuing process on the basis of the article data contained in the department PLU file. In the label issuing process, the EWPD 2 measures the weight of a sales article, multiplies the measured weight by the unit price included in the article data of the sales article to determine the price of that sales article, and then prints out the computed price, as well as weight, unit price, and other relevant information on a label sheet. When the label issuing process has been completed, the EWPD 2 which performs the issuing process produces sales data and, upon request from the host computer 1, supplies the sales data thereto by radio communication.

FIG. 2 shows the structure of the host computer 1. The host computer 1 includes a CPU 11, a ROM 12, a RAM 13, a timepiece circuit 14, a hard-disk drive 15A, a hard-disk drive controller 15, a communication interface 16, an input/output port 17, a keyboard 17A, a display 17B, a floppy-disk drive, and a system bus 18. The CPU 11 is connected by a system bus 18 to the ROM 12, the RAM 13, the timepiece circuit 14, the hard-disk drive controller 15, and the communication interface 16. The ROM 12 stores a control program to be executed by the CPU 11. The CPU 11 performs various control processes according to the control program. These processes include a process for managing the PLU file, the sales file and other files, and a process for controlling communication with the EWPDs 2. The RAM 13 temporarily stores data input to and output from the CPU 11 in the processes. Transmission and reception buffers BF are provided in the RAM 13 to store transmission and reception texts, respectively. The timepiece circuit 14 generates time and date data representing the current time and date. The hard-disk drive 15A stores the PLU file, the sales file, and other files managed by the CPU 11. The hard-disk controller 15 is connected to the hard-disk drive 15A to control its operation. The communication interface 16 is connected to the first radio communication unit 3 in order to interface it with the CPU 11. The first radio communication unit 3 performs radio communication with the second radio communication unit(s) 3 provided on the side of the EWPDs. An Input/Output (I/O) port 17 is connected to the keyboard 17A, the display 17B and the floppy-disk drive 17C. The keyboard 17A is used to input various data and commands, and the display 17B is used to display various data. The floppy-disk drive 17C is used to store data input to and output from the CPU 11, control programs, and other programs or files.

FIG. 3 shows in detail the structure of an EWPD 2. The EWPD 2 includes a CPU 21, a ROM 22, a RAM 23, a timepiece circuit 24, a hard-disk controller 25, a communication interface 26, an A/D converter 27, a load cell scale 27A, an amplifier 27B, an I/O port 28, a keyboard 28A, a display 28B, a printer 28C, and a system bus 29. The CPU 21 is connected to the ROM 22, the RAM 23, the timepiece circuit 24, the hard-disk drive controller 25, the communication interface 26, the A/D converter 27, and the I/O port 28 by the system bus 29. The ROM 22 stores a control program to be executed by the CPU 21. The RAM 23 temporarily stores data input to and output from the CPU 21. The CPU 21 performs various control processes according to the control program. These control processes include a process for controlling communication with the host computer 1, a process for managing a department PLU file constituted by items of article data supplied from the host computer 1, and a process for issuing a label on the basis of the article data included in the department PLU file. The timepiece circuit 24 generates time and date data representing the current time and date. A load cell scale 27A is connected to the A/D converter 27 via an amplifier 27B. The load cell 27A measures the weight of a sales article, supplies the measured weight to the amplifier 27B in the form of an analog signal. The amplifier 27B then amplifies the analog signal and delivers the amplified signal to the A/D converter 27, which in turn converts the analog signal to a digital signal and supplies the digital signal to the CPU 21. The I/O port 28 is connected to the keyboard 28A, the display 28B, and the printer 28C. The keyboard 28A is used to input various commands and data. The display 28B is used to display the names, the unit prices, the weights, the computed prices, and other data of articles being weighed and priced. The printer 28C prints out these data of the articles, i.e., the names, the unit prices, the weights, the computed prices, etc., on a label sheet. The communication interface 26 is connected to the second radio communication unit 3 in order to interface it with the CPU 21. The second radio communication unit 3 performs radio communication with the first radio communication unit 3 provided on the host computer side.

In the communication between the host computer 1 and the EWPD 2, various control texts for communication procedures are required in addition to data texts such as article data and sales data. The control and data texts are provided in a predetermined order. The CPU 11 (21) selectively retrieves one of the control and data texts as a transmission text and converts the transmission text into the form of a single character or a series of characters, and supplies the transmission text through the communication interface 16 (26) to the radio communication unit 3. The last character of the transmission text is one of specified control characters and a character of error check data. The specified control character is provided for the control text, and the character of error check data is provided for the data text. The error check data is used in horizontal parity check or the like effected to detect a reception error.

The CPU 11 (21) adds a dummy character [FIX] to the transmission text as a new last character, except in the case where the transmission text is a control text and in the case where the transmission text is a data text and the error check data thereof has a value identical to the code of the dummy character [FIX]. The radio communication unit 3 includes a buffer memory 3A, a transmitter 3B, and a receiver 3C. The buffer memory 3A stores each character of a transmission text supplied from the communication interface 16 (26) and each character of a reception text supplied from the receiver 3C. The transmitter 3B performs a transmission process on the transmission text stored in the buffer memory 3A when any one of the dummy character [FIX] and specified control characters is detected to be included in the transmission text. The receiver 3C receives a reception text formed of a single character or a series of characters, the last of which is one of the dummy character [FIX] and specified control characters. Each character of the reception text is stored in the buffer memory 3A, and supplied via the communication interface 16 (26) to the reception buffer BF in the RAM 13 (23). The CPU 11 (21) invalidates a character succeeding the character of error check data in the reception text, except in the case where the reception text is a control text.

FIG. 4 shows an example of the communication sequence effected between the host computer 1 and the EWPDs 2 to set article data in a department PLU file. The host computer 1 initially transmits a control text SEL to select one of the EWPDs 2 or terminals. The selected EWPD 2 receives the control signal SEL, and transmits a control text ACK to acknowledge the terminal selection. The host computer 1 transmits the control text ACK, and transmits a data text COMMAND representing an article data setting command. The EWPD 2 receives the data text COMMAND, and transmits a control text ACK to acknowledge the article data setting command. The host computer 1 receives the control text ACK, and transmits a control text POL to request a status report. The EWPD 2 receives the control text POL, and transmits a data text STATUS representing its status. The host computer 1 receives the data text STATUS, and transmits a control text ACK to acknowledge the status. The EWPD 2 receives the control text ACK, and transmits a control text EOT to report an end of transmission.

After receiving a status capable of starting the article data setting process, the host computer 1 transmits a control text SEL to select the aforementioned EWPD 2 again. The selected EWPD 2 receives the control text SEL, and transmits a control text ACK to acknowledge the selection. The host computer 1 receives the control text ACK, and transmits a data text PLU representing the article data to be set in the department PLU file. The EWPD 2 receives the data text PLU, and transmits a control text ACK. (If an error has been detected in the received data text PLU, a control text NAK is transmitted to request that the host computer 1 transmits the same data text PLU again.)

As long as another data text PLU to be transmitted exists after receiving a control text ACK, the host computer 1 repeatedly performs the transmission of a control text SEL, the reception of a control text ACK, and the transmission of the data text PLU.

After all the data texts PLU have been transmitted, the host computer 1 transmits a control text SEL to select the aforementioned EWPD 2 again. The EWPD 2 receives the control text SEL, and transmits a control text ACK to acknowledge the selection. The host computer 1 receives the control text ACK, and transmits a data text COMMAND representing an end command of an article data setting process. The EWPD 2 receives the data text COMMAND, and transmits a control text ACK to acknowledge the end command. The host computer 1 receives the control text ACK, and transmits a control text POL to request a status report. The EWPD 2 receives the control text POL, and transmits a data text STATUS representing a status in which the article data setting process has been ended. The host computer 1 receives the data text STATUS, and transmits a control text ACK to acknowledge the status. The EWPD 2 receives the control text ACK, and transmits a control text EOT to report an end of transmission.

FIG. 5A shows an example of the data texts PLU, COMMAND, and STATUS. Each of the data texts PLU, COMMAND, and STATUS includes a character [BCC] of error check data which is used in a horizontal error check effected to detect a reception error. The character [BCC] is provided as the last character of the data text, and its value varies with the contents of data DATA. On the other hand, control characters [ACK], [NAK], [EOT], and [ENQ] are included in the control texts ACK, NAK, EOT, and POL shown in FIGS. 5C to 5F, respectively. The control characters [ACK], [NAK], [EOT], and [ENQ] differ from the character [BCC] in that they have fixed codes or values. Since the control characters [ACK], [NAK], [EOT], and [ENQ] are provided as the last characters, they are defined as "specified control characters" distinguished from other control characters [SOH], [AD1], [AD2], [STX], [ETX], and [POL], for example. Further, the control text SEL also includes a specified control character as the last character. (FIG. 5F shows a control character [EOT] included in the control text POL. However, this character [EOT] is not defined as the specified control character in the host computer 1.)

Figure 5B:
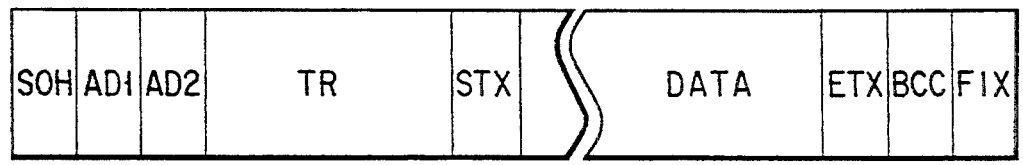
Figure 5C:
Figure 5D:
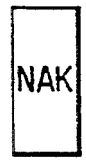
Figure 5E:
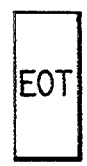
Figure 5F:
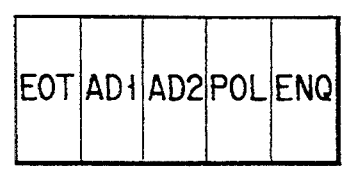

FIG. 5B shows a data text including a dummy character [FIX] as the last character. As shown in FIG. 5A, this character [FIX] is added to the data text except in the case where the error check data of the data text has a value identical to the code of the dummy character [FIX].

The operation of the POS system will be described below.

Figure 6:
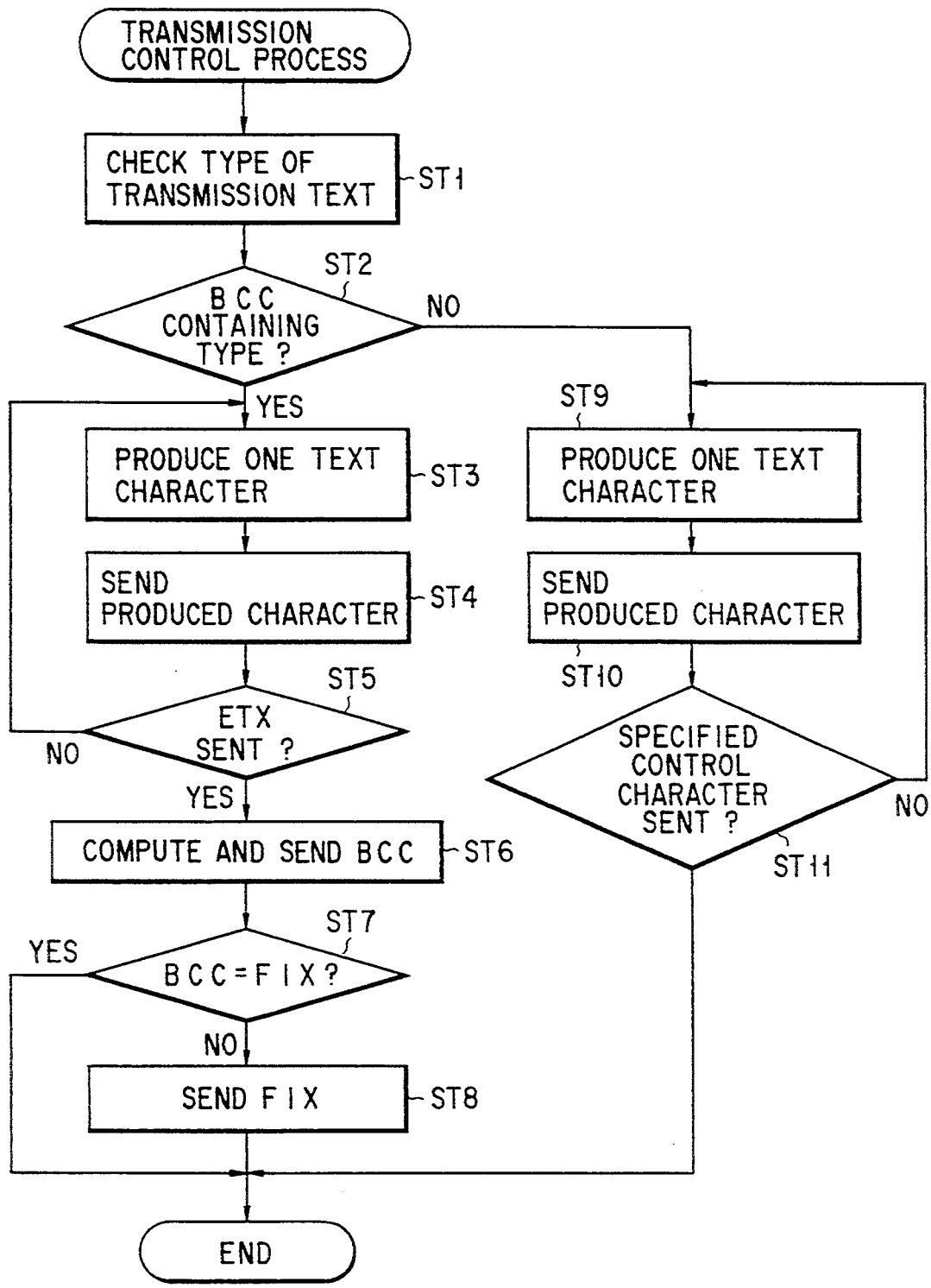
FIG. 6 is a flowchart illustrating a transmission control process performed in the host computer shown in FIG. 2 and the EWPD shown in FIG. 3.

FIG. 6 shows a transmission control process performed in the host computer 1 and the EWPD 2. The transmission control process is performed each time a transmission text is retrieved for transmission. After the transmission control process is started, the type of the transmission text retrieved is checked in step ST1. Step ST2 is executed to confirm from the check result that the transmission text is a data text which should contain the character [BCC]. After the confirmation, character-conversion is effected on the transmission text to produce one character in step ST3, and the produced character is sent to the radio communication unit 3 in step ST4. Thereafter, steps ST3 and ST4 are repeated to produce the subsequent characters and to send them to the radio communication unit 3. When it is detected in step ST5 that a control character [ETX] is sent, computation for obtaining the character [BCC] of error check data is performed on the transmission text in step ST6. The obtained character [BCC] is sent to the radio communication unit 3. When the value of the error check data is detected to be identical to the code of the dummy character [FIX] in step ST7, the transmission control process is terminated. If the value of the error check data is not identical to the code of the character [FIX], the dummy character [FIX] is sent to the radio communication unit 3 in step ST8. Subsequently, the transmission control process is terminated.

If it is detected in step ST2 that the transmission text is a control text, which should not contain the character [BCC] of error check data, character-conversion is effected on the transmission text to produce one character in step ST6, and the produced character is sent to the radio communication unit 3 in step ST10. Thereafter, steps ST9 and ST10 are repeated to produce the subsequent characters and to send them to the radio communication unit 3. When it is detected in step ST11 that a specified control character is sent to the radio communication unit 3, the transmission control process is terminated.

Figure 7:
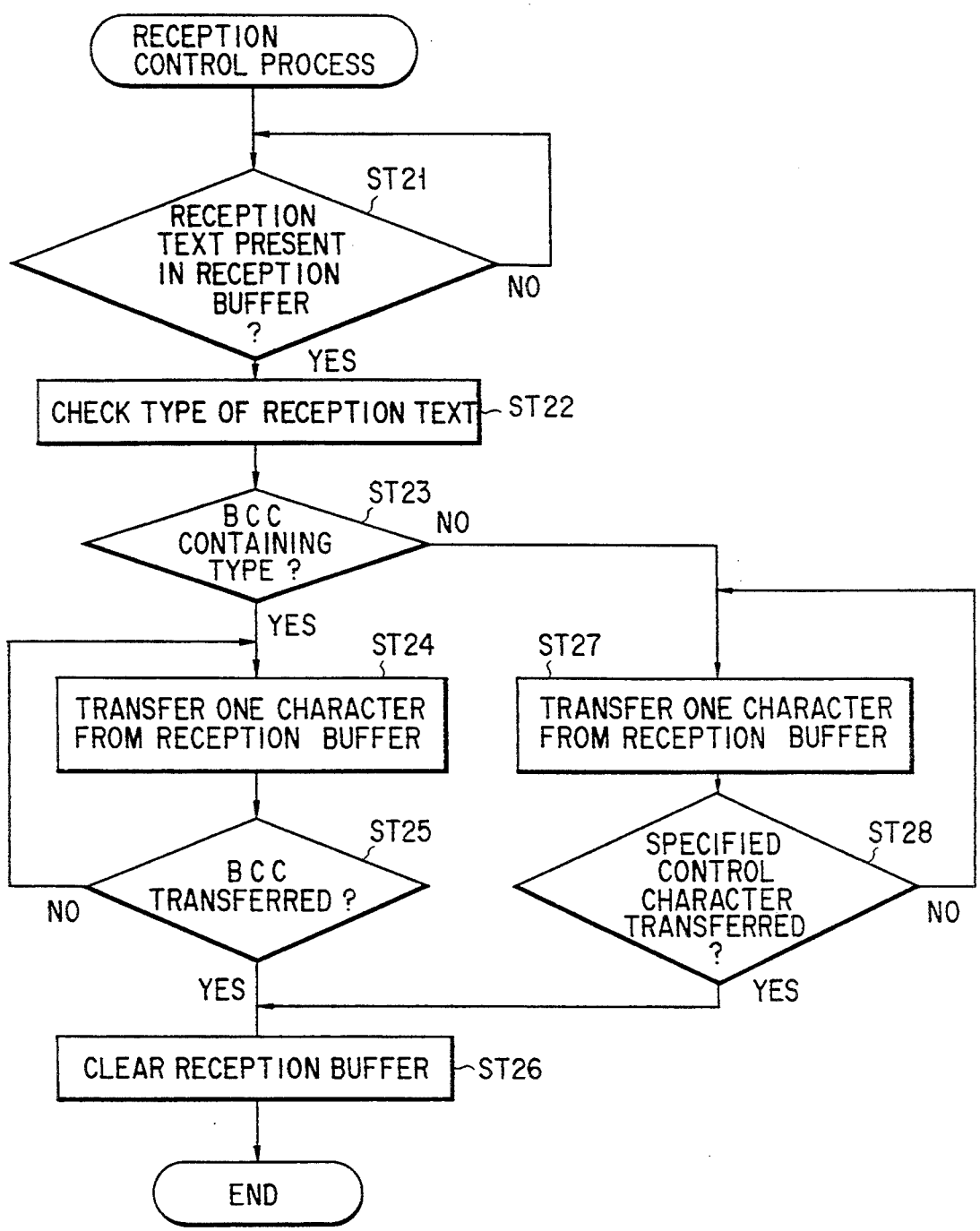
FIG. 7 is a flowchart illustrating a reception control process performed in the host computer shown in FIG. 2 and the EWPD shown in FIG. 3.

FIG. 7 shows a reception control process performed in the host computer 1 and the EWPD 2. When the reception control process is started, it is checked in step ST21 whether the received characters of the reception text are present in the reception buffer BF of the RAM. When presence of the characters is detected, the type of the reception text is checked in step ST22. When it is detected that the reception text is a data text which should contain the character [BCC] of error check data, one character of the reception text is transferred from the reception buffer BF to another work area in step ST24 so as to perform a process corresponding to the character. Step ST24 is repeated to transfer the subsequent characters of the reception text. When it is detected in step ST25 that the character [BCC] of error check data has been transferred, the contents of the reception buffer BF is cleared in step ST26. At this time, a dummy character [FIX] added after the character [BCC] is deleted without being transferred to the work area. Thereafter, the reception control process is terminated.

If it is detected in step ST23 that the reception text is a control text, which should not contain the character [BCC] of error check data, one character of the reception text is transferred from the reception buffer BF to another work area in step ST27 so as to perform a process corresponding to the transferred character. Step ST27 is repeated to transfer the subsequent characters of the reception text. When it is detected in step ST28 that a specified control character has been transferred, the contents of the reception buffer BF is cleared in step ST26, and then the reception control process is terminated.

In the POS system of the embodiment described above, a dummy character [FIX] is added to a transmission text as a new last character except in the case where the transmission text is a control text and in the case where the transmission text is a data text and the error check data thereof has a value identical to the code of the dummy character [FIX]. As a result, the radio communication unit 3 can start transmitting the transmission text immediately after any one of the dummy and specified control characters is detected to be included in the transmission text. Since it is not necessary to have a predetermined amount of time elapsed before the start of the text transmission, the total communication time can be reduced, as compared to conventional communication apparatus and method.

Further, the dummy character [FIX] is not added to the transmission text whose last character is a character [BCC] of error check data having a value identical to the code of the dummy character [FIX]. Therefore, after the character [BCC] has been transmitted, any redundant transmission can be prevented from being effected.

In the above embodiment, the present invention is applied to a POS system. However, this invention can be applied to various types of data processing systems having a function of performing radio data communication.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A communication apparatus comprising:
   transmission control means for obtaining a transmission text formed of a single character which is one of a specified control character and a character of error check data, and, when said single character is a character of error check data, adding a dummy character after said character of error check data as a new last character except in a case where said character of error check data has a value identical to a code of said dummy character; and
   transmitting means connected to said transmission control means, for storing each character of said transmission text supplied from said transmission control means, and for transmitting said transmission text upon detecting a code of any one of said dummy character in said transmission text and a specified control character in said transmission text.

2. A communication apparatus according to claim 1, further comprising receiving means for receiving, as a reception text, a series of characters which includes a character of error check data, and for invalidating a character succeeding said character of error check data in said reception text.

3. A communication apparatus according to claim 2, wherein:
said transmitting means includes a radio transmission section for transmitting a transmission text as a radio signal; and
said receiving means includes a radio receiving section for receiving said transmission text transmitted as a radio signal.

4. A communication apparatus according to claim 3, further comprising a POS system including a host computer, and wherein said transmission control means is incorporated in said host computer of said POS system.

5. A communication apparatus according to claim 3, further comprising a POS system including a terminal, and wherein said transmission control means is incorporated in said terminal of said POS system.

6. A communication apparatus according to claim 1, wherein said transmitting means includes a memory for storing each character of a transmission text.

7. A communication method comprising the steps of:
obtaining a transmission text formed of a single character which is one of a specified control character and a character of error check data, and, when said single character is a character of error check data, adding a dummy character after said character of error check data as a new last character except in a case where said character of error check data has a value identical to a code of the dummy character; and
storing each character of said transmission text provided in said obtaining and adding step, and transmitting said transmission text upon detecting a code of any one of said dummy character in said transmission text and a specified control character in said transmission text.

8. A communication method according to claim 7, further comprising receiving, as a reception text, a series of characters which includes a character of error check data, and invalidating a character succeeding said character of error check data in said reception text.

9. A communication apparatus comprising:
transmission control means for obtaining a transmission text comprising a series of characters, said series of characters having a last character which is one of a specified control character and a character of error check data, and, when said last character of said series of characters is a character of error check data, for adding a dummy character after said character of error check data as a new last character except in a case where said character of error check data has a value identical to a code of said dummy character; and
transmitting means connected to said transmission control means, for storing each character of said transmission text supplied from said transmission control means, and for transmitting said transmission text upon detecting a code of any one of said dummy character in said transmission text and a specified control character in said transmission text.

10. A communication apparatus according to claim 9, further comprising receiving means for receiving, as a reception text, a series of characters which includes a character of error check data, and for invalidating a character succeeding said character of error check data in said reception text.

11. A communication apparatus according to claim 10, wherein:
said transmitting means includes a radio transmission section for transmitting a transmission text as a radio signal; and
said receiving means includes a radio receiving section for receiving said transmission text transmitted as a radio signal.

12. A communication apparatus according to claim 11, further comprising a POS system including a host computer, and wherein said transmission control means is incorporated in said host computer of said POS system.

13. A communication apparatus according to claim 11, further comprising a POS system including a terminal, and wherein said transmission control means is incorporated in said terminal of said POS system.

14. A communication apparatus according to claim 9, wherein said transmitting means includes a memory for storing each character of a transmission text.

15. A communication method comprising the steps of:
obtaining a transmission text which comprises a series of characters, said series of characters including a last character which is one of a specified control character and a character of error check data, and, when said last character of said series of characters is a character of error check data, adding a dummy character after said character of error check data as a new last character except in a case where said character of error check data has a value identical to a code of the dummy character; and
storing each character of said transmission text provided in said obtaining and adding step, and transmitting said transmission text upon detecting a code of any one of said dummy character in said transmission text and a specified control character in said transmission text.

16. A communication method according to claim 15, further comprising receiving, as a reception text, a series of characters which includes a character of error check data, and invalidating a character succeeding said character of error check data in said reception text.

* * * * *